US009772704B2

(12) United States Patent
Yousefpor

(10) Patent No.: US 9,772,704 B2
(45) Date of Patent: Sep. 26, 2017

(54) DISPLAY/TOUCH TEMPORAL SEPARATION

(71) Applicant: Apple Inc., Cupertino, CA (US)

(72) Inventor: Marduke Yousefpor, San Jose, CA (US)

(73) Assignee: Apple Inc., Cupertino, CA (US)

( * ) Notice: Subject to any disclaimer, the term of this patent is extended or adjusted under 35 U.S.C. 154(b) by 557 days.

(21) Appl. No.: 13/968,228

(22) Filed: Aug. 15, 2013

(65) Prior Publication Data
US 2015/0049041 A1 Feb. 19, 2015

(51) Int. Cl.
G06F 3/041 (2006.01)
G06F 3/044 (2006.01)
G09G 3/36 (2006.01)

(52) U.S. Cl.
CPC ........... G06F 3/0412 (2013.01); G06F 3/044 (2013.01); G06F 3/0416 (2013.01); G09G 3/36 (2013.01)

(58) Field of Classification Search
CPC .... G06F 3/0416; G06F 3/04886; G06F 3/041; G06F 3/044; G06F 3/0412; G06F 1/1616; G06F 1/1626; G06F 1/1643; G06F 1/1647; G06F 1/1692; H04M 2250/22; H04M 1/0214; H04M 1/0266; H04N 1/00411; H04N 2005/443; B32B 2457/20; B32B 2457/202; B32B 2457/208; G09G 3/20; G09G 2300/08
USPC ................................................ 345/173–174
See application file for complete search history.

(56) References Cited

U.S. PATENT DOCUMENTS

| | | | |
|---|---|---|---|
| 5,483,261 | A | 1/1996 | Yasutake |
| 5,488,204 | A | 1/1996 | Mead et al. |
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |

(Continued)

FOREIGN PATENT DOCUMENTS

| | | |
|---|---|---|
| JP | 58-056190 A | 4/1983 |
| JP | 2000-163031 A | 6/2000 |

(Continued)

OTHER PUBLICATIONS

International Search Report mailed Oct. 27, 2014, for PCT Application No. PCT/US2014/047383, four pages.

(Continued)

*Primary Examiner* — Amare Mengistu
*Assistant Examiner* — Gloryvid Figueroa-Gibson
(74) *Attorney, Agent, or Firm* — Morrison & Foerster LLP

(57) ABSTRACT

Touch sensitive displays are disclosed that can include circuitry that is segmented into multiple portions that can be independently operated. Touch sensitive display circuitry can be split in half with an upper portion and a lower portion that can each be independently operated. The separate circuitry portions can be used for performing display operations and for performing touch sensing operations. Display operations can be performed in one portion of the display while touch sensing operations are simultaneously performed in another portion of the display. Periodically, the operation being performed in a given portion of the display can be switched so as to alternatingly update that portion of the display and sense touch events in that region.

21 Claims, 7 Drawing Sheets

(56) References Cited

U.S. PATENT DOCUMENTS

| | | |
|---|---|---|
| 6,310,610 B1 | 10/2001 | Beaton et al. |
| 6,323,846 B1 | 11/2001 | Westerman et al. |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,663,607 B2 | 2/2010 | Hotelling et al. |
| 8,259,078 B2 | 9/2012 | Hotelling et al. |
| 8,479,122 B2 | 7/2013 | Hotelling et al. |
| 2005/0093784 A1 | 5/2005 | Sakurai |
| 2005/0243068 A1* | 11/2005 | Johnson ............... G06F 3/0412 345/173 |
| 2006/0197753 A1 | 9/2006 | Hotelling |
| 2007/0139355 A1 | 6/2007 | Ryuh et al. |
| 2007/0152951 A1* | 7/2007 | Ahn ............... G09G 3/342 345/102 |
| 2008/0055495 A1 | 3/2008 | Cernasov |
| 2009/0009486 A1 | 1/2009 | Sato et al. |
| 2009/0267903 A1* | 10/2009 | Cady et al. ............... 345/173 |
| 2010/0156795 A1 | 6/2010 | Kim et al. |
| 2012/0038561 A1 | 2/2012 | Han |
| 2012/0162104 A1* | 6/2012 | Chang ............... G06F 3/0412 345/173 |
| 2012/0256849 A1 | 10/2012 | Crumly |
| 2013/0076647 A1 | 3/2013 | Yousefpor et al. |
| 2013/0076683 A1 | 3/2013 | Reeves |
| 2013/0094166 A1 | 4/2013 | Yokoyama et al. |
| 2013/0176276 A1* | 7/2013 | Shepelev ............... 345/174 |
| 2013/0257749 A1 | 10/2013 | Woods et al. |
| 2013/0342483 A1 | 12/2013 | Seo et al. |

FOREIGN PATENT DOCUMENTS

| | | |
|---|---|---|
| JP | 2002-342033 A | 11/2002 |
| KR | 10-2009-0004678 A1 | 1/2009 |
| WO | WO-2015/023397 A1 | 2/2015 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

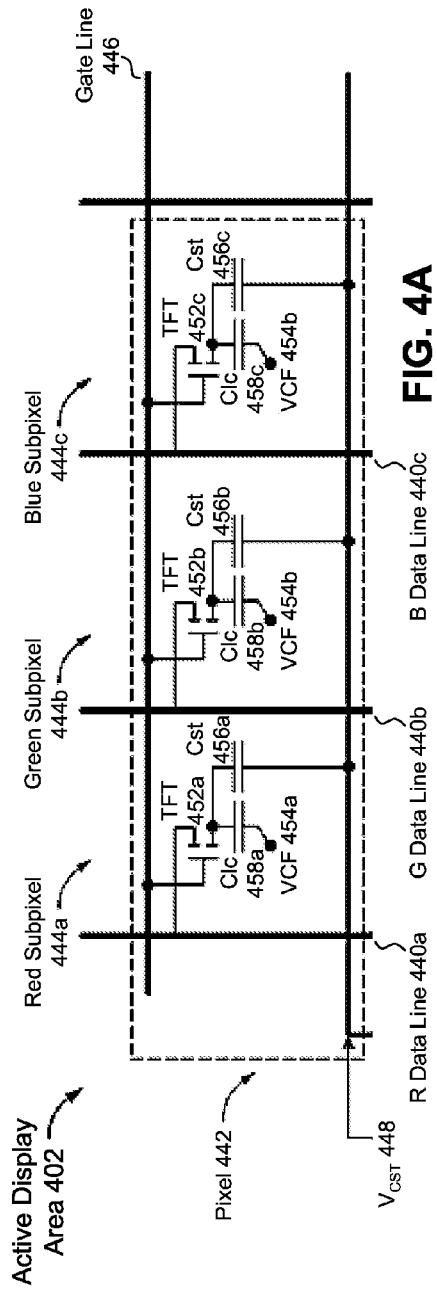
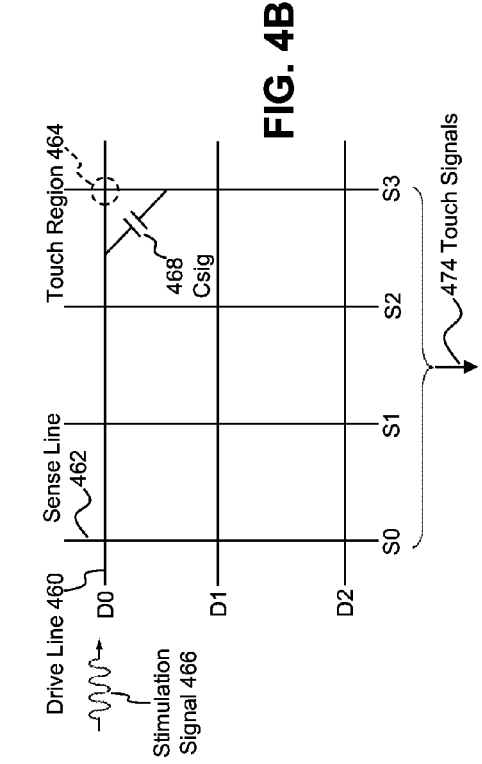

Personal Device 800

Personal Device 700

DISPLAY/TOUCH TEMPORAL SEPARATION

FIELD

This relates generally to touch sensitive displays and, more specifically, to display and touch circuitry that is separated into independently operable portions within a single touch sensitive display unit.

BACKGROUND

Touch sensitive devices have become popular as input devices to computing systems due to their ease and versatility of operation as well as their declining price. A touch sensitive device can include a touch sensor panel, which can be a clear panel with a touch sensitive surface, and a display device, such as a liquid crystal display (LCD), that can be positioned partially or fully behind the panel or integrated with the panel so that the touch sensitive surface can cover at least a portion of the viewable area of the display device. The touch sensitive device can allow a user to perform various functions by touching the touch sensor panel using a finger, stylus, or other object at a location often dictated by a user interface (UI) being displayed by the display device. In general, the touch sensitive device can recognize a touch or hover event and the position of the touch or hover event on the touch sensor panel, and the computing system can then interpret the touch or hover event in accordance with the display appearing at the time of the touch or hover event, and thereafter can perform one or more actions based on the touch or hover event.

When display circuitry is driven with data signals to control what is being displayed, noise can be introduced into touch sensing circuitry, and the noise can interfere with touch sensing operations. Similarly, when touch circuitry is driven with strong signals to, for example, increase touch sensitivity or counteract interference, noise from touch circuitry can be introduced into display circuitry, and the noise can disturb picture quality and distort what is displayed. In addition, updating display data and sensing touch events across a large display can be time consuming, thereby limiting potential refresh rates and touch event responsiveness.

SUMMARY

Touch sensitive displays are disclosed that can include circuitry that is segmented into multiple portions that can be independently operated. In one example, touch sensitive display circuitry can be split in half with an upper portion and a lower portion that can each be independently operated. The separate circuitry portions can be used for performing display operations and for performing touch sensing operations. In some examples, display operations can be performed in one portion of the display while touch sensing operations are simultaneously performed in another portion of the display. Periodically, the display operations can be switched to the other portion of the display to update that portion, while simultaneously the touch operations can be switched to the one portion of the display to sense touch or hover events in that portion.

In some examples, segmenting display and touch sensing circuitry into multiple portions can increase the bandwidth of display data lines for each portion. Display updating operations can be performed in less time (e.g., half the update frame time or less), and some or all of the remaining surplus frame time can be used to perform touch sensing operations. For example, display data can be updated in both halves of a segmented display during a first half of an update frame (or some other portion), and touch sensing operations can then be performed in both halves of the segmented display during some or all of the second half of the update frame (or some other portion) that remains.

BRIEF DESCRIPTION OF THE DRAWINGS

FIG. 4A illustrates exemplary LCD display circuitry and FIG. 4B illustrates exemplary touch sensing circuitry in an on-cell or back-of-cover configuration according to various examples.

DETAILED DESCRIPTION

Figure 1:
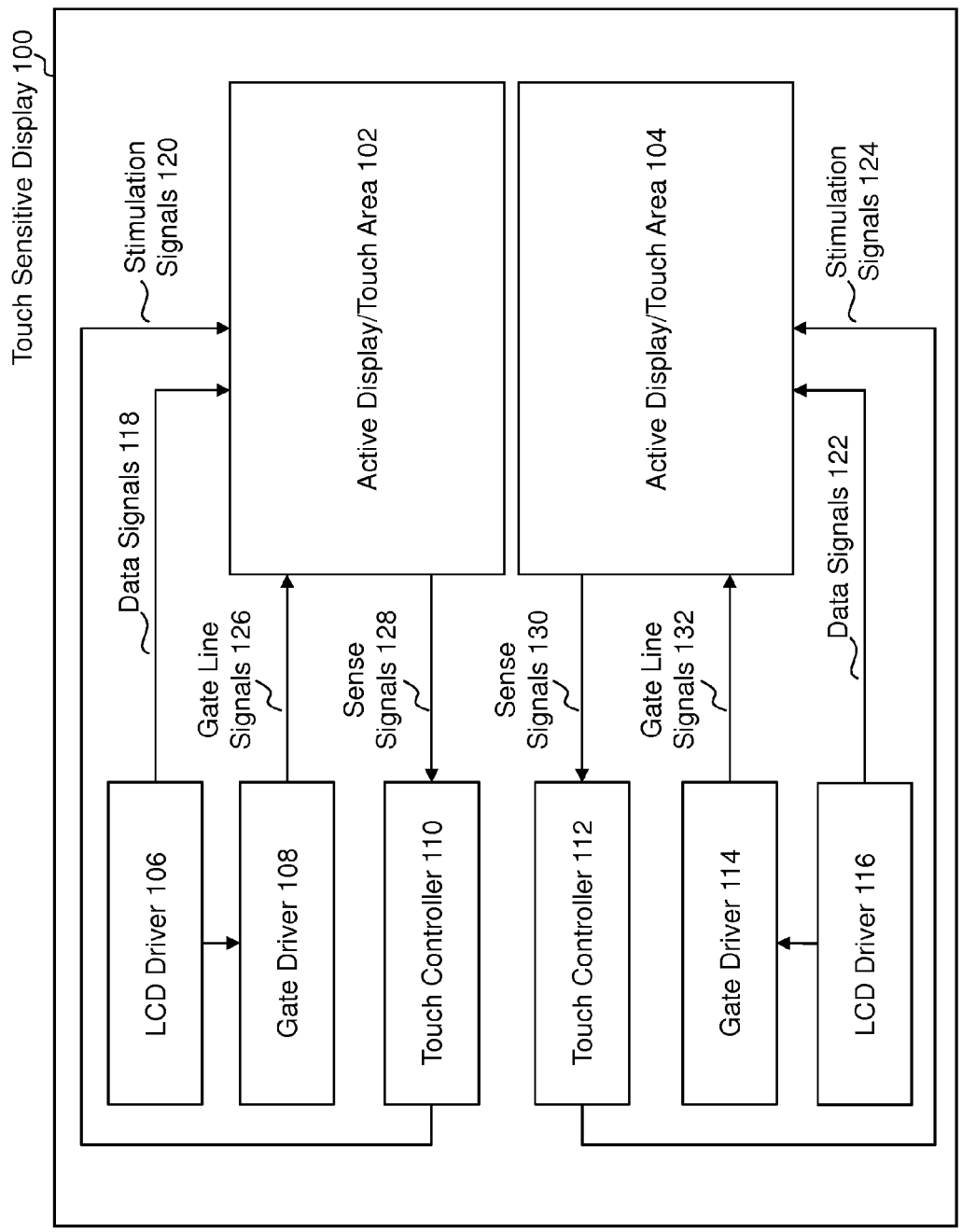
FIG. 1 illustrates an exemplary touch sensitive display with multiple display/touch areas according to various examples.

In the following description of examples, reference is made to the accompanying drawings in which it is shown by way of illustration specific examples that can be practiced. It is to be understood that other examples can be used and structural changes can be made without departing from the scope of the various examples.

This relates to touch sensitive displays having circuitry that can be segmented into multiple portions that can be independently operated. In one example, touch sensitive display circuitry can be split in half with an upper portion and a lower portion that can each be independently operated. The separate circuitry portions can be used for performing display operations and for performing touch sensing operations. In some examples, display operations can be performed in one portion of the display and touch sensing operations can be simultaneously performed in another portion of the display. After a period of time, the operation being performed in a given portion of the display can be switched so as to alternatingly update that portion of the display and sense touch events in that region while keeping the two operations temporally and/or spatially separated.

In some examples, touch sensing circuitry can be integrated with display circuitry to use common voltage or data lines. In other examples, touch sensing circuitry can be positioned on the back of a piece of cover glass, and display circuitry can be separately positioned in a lower layer in a touch sensitive display stack. In any of the various examples, display updating and touch operations can be performed in one portion of the display independently from display updating and touch operations in another portion of the display, thereby temporally separating the operations.

By segmenting the display and touch sensing circuitry into multiple portions within a single display unit, various improvements can be achieved over other touch sensitive display approaches. In some examples, touch sensitive display stacks can be so narrow as to introduce a significant risk of noise injection from display circuitry into touch sensing circuitry or from touch sensing circuitry into display circuitry. For example, while separating display circuitry and touch sensing circuitry by an air gap can help prevent noise injection, such an air gap can increase the thickness of the touch sensitive display stack. Minimizing or excluding such an air gap can beneficially narrow the stack, but the decreased distance between display circuitry and touch sensing circuitry can lead to noise injection. By segmenting the display and touch sensing circuitry into multiple portions within a single display unit, however, display operations can be performed in one portion of the display while touch sensing operations are performed in a different portion of the display so as to avoid interference. After a certain time interval, the operations in the portions can be switched to update the display and sense touch events alternatingly while avoiding interference between the two operations.

In other examples, to combat noise injection from nearby display circuitry or other sources, the signal strength of stimulation signals used for touch sensing can be increased. Increasing the signal strength of stimulation signals, however, can lead to noise injection into display circuitry (e.g., altering gray levels or the like). By segmenting the display and touch sensing circuitry into multiple independently operable portions, the need for increased signal strength can be avoided, and display and touch sensing operations can be alternated to limit interference even with weaker stimulation signals.

In addition, by segmenting the display and touch sensing circuitry into multiple portions, the display data update rate or refresh rate can be increased (or similarly the time required to update a portion of the display can be reduced) as the capacitance is reduced for data lines in a given portion of the display, thereby freeing up time for additional operations and the like. For example, the capacitance of the display circuitry data lines can be cut approximately in half (extending only half the distance across the display). Having half the capacitance can reduce the time it takes to charge a data line with a data signal to update a row or column of display pixels, thereby reducing the delay before moving on to a subsequent row or column of display pixels. In other words, in contrast to the time it takes to charge a data line that traverses the length of both halves of a display combined, the time to charge a data line that traverses only half of the display can be significantly less (e.g., half), thereby requiring less time between an update or refresh of each subsequent row or column of display pixels.

In particular, display data line bandwidth can be limited by a resistive-capacitive (RC) time constant of the display panel. By segmenting the display, the RC time constant for each segment or portion of the display can be significantly smaller than the RC time constant for a similar display that is not segmented (e.g., half the RC time constant). With a smaller RC time constant, the display image can be updated on each segment or portion of the display in a smaller frame time (e.g., roughly half the frame time). With display operations occupying less frame time, in some examples, remaining frame time can be used to perform touch sensing operations. Frame rate can thus be increased and/or surplus frame time can be used to perform other operations besides updating the display data (e.g., touch sensing operations).

Accordingly, segmenting display and touch sensing circuitry into multiple portions can advantageously reduce the time to update or refresh a portion of the display, allowing for an increased display data update rate or refresh rate. It should be appreciated that similar improvements from reduced capacitance can be realized in touch sensing circuitry.

It should be understood that still many other advantages can be achieved by segmenting display and touch sensing circuitry into multiple portions within a single display unit.

The terms "drive line," "sense line," "data line," "gate line," "common voltage line," "xVcom," and "yVcom" can refer to conductive lines of the display. In some cases, though not always, the term "drive line" can be used when referring to conductive lines used to transmit a stimulation signal for touch sensing operations. The term "sense line" can be used when referring to conductive lines used to transmit sense signals from touch events. The term "data line" can be used when referring to conductive lines used to transmit display data to display pixels. The term "gate line" can be used when referring to conductive lines used to select display pixels for receiving display data. The terms "common voltage line," "xVcom," and "yVcom" can refer to conductive lines used to supply voltage to multiple circuit elements.

The term "subpixel" can refer to a red, green, or blue display component of the display, while the term "pixel" can refer to a combination of a red, a green, and a blue subpixel. However, various examples are not restricted to red-green-blue (RGB) displays and can include other types of displays, such as monochrome displays.

FIG. 1 illustrates exemplary touch sensitive display 100 with multiple display/touch areas that can be independently operated: active display/touch area 102 and active display/touch area 104. Touch sensitive display 100 can be integrated into a variety of touch sensitive devices, such as mobile phones, tablets, touchpads, portable computers, portable media players, or the like. Active display/touch area 102 and active display/touch area 104 can be immediately adjacent one another and separated by a gap. The separation can be invisible to the naked eye. In some examples, a gap can separate some circuitry while other display elements and layers can extend across both areas 102 and 104. For example, display and touch sensing circuitry for area 102 can be separated from display and touch sensing circuitry for area 104, but a single cover glass (or cover plastic) and other touch sensitive display stack elements can extend across both areas 102 and 104. In this manner, touch sensitive display 100 can appear to have a single display/touch area, although circuitry embedded in the display/touch area can be segmented.

Touch sensitive display 100 can include multiple drivers and controllers for controlling what is displayed as well as for sensing touch or hover events from a finger, stylus, or other object on or near active display/touch areas 102 and 104. Drivers and controllers can be electrically connected to or in communication with each other. For example, LCD driver 106 can generate data signals 118 that supply display data to data lines that extend across active display/touch area 102. Data can include red, green, or blue subpixel values, gray values, or the like.

In addition, LCD driver 106 can communicate with gate driver 108 to coordinate the generation of gate line signals 126. Gate line signals 126 can control gate lines that extend across active display/touch area 102 in a direction perpendicular to data lines driven with data signals 118. When activated, gate line signals 126 can control which pixels of the display are updated with data supplied from data signals 118. For example, a display pixel can be formed at or near the intersection of a data line and a gate line. When the gate line is activated for a particular row or column of pixels, the data from data signals 118 can update or refresh what is displayed on the selected row or column of pixels. Thus, LCD driver 106 and gate driver 108 can control what is displayed on active display/touch area 102.

Independent from LCD driver 106 and gate driver 108, LCD driver 116 and gate driver 114 can control what is displayed on active display/touch area 104. LCD driver 116 can generate data signals 122 that supply display data to data lines that extend across active display/touch area 104. LCD driver 116 can communicate with gate driver 114 to coordinate the generation of gate line signals 132 to control gate lines that extend across active display/touch area 104 in a direction perpendicular to data lines driven with data signals 122. When activated, gate line signals 132 can control which pixels of the display are updated with data supplied from data signals 122 (e.g., a particular row or column of pixels). Thus, LCD driver 116 and gate driver 114 can control what is displayed on active display/touch area 104 independently from LCD driver 106 and gate driver 108 controlling what is displayed on active display/touch area 102.

Although FIG. 1 illustrates LCD drivers 106 and 116 as separate elements, in other examples, a single LCD driver can control both area 102 and area 104 by generating both data signals 118 and data signals 122. Similarly, although gate drivers 108 and 114 are illustrated as separate elements, in other examples, a single gate driver can generate both gate line signals 126 and 132. It should also be recognized that some integrated circuits can allow various control elements to be combined into a single multi-purpose control circuit (e.g., an application-specific integrated circuit or ASIC that includes, for example, both an LCD driver and a gate driver). In any of the various examples, display updating operations can be performed on active display/touch area 102 independently from display updating operations on active display/touch area 104.

In addition to performing display operations on active display/touch area 102 separately from display operations on active display/touch area 104, touch sensing operations can be performed on active display/touch area 102 separately from touch sensing operations on active display/touch area 104. Touch sensing operations can use a variety of different stimulation and touch sensing approaches, such as single stimulation (single stim) in which single rows or columns can be stimulated sequentially one at a time, multiple stimulation (multi-stim) in which multiple rows or columns can be simultaneously stimulated, orthogonal frequency-division multiplexing (OFDM), other phase coding or frequency coding techniques, or the like.

Touch sensitive display 100 can include touch controller 110 that can control touch sensing operations in active display/touch area 102. Touch controller 110 can generate stimulation signals 120 and can receive sense signals 128. In one example, stimulation signals 120 can supply touch drive lines that extend across active display/touch area 102. Sense signals 128 can be derived from sense lines that extend across active display/touch area 102 in a direction perpendicular to the touch drive lines. Touch nodes can be formed at the intersections of touch drive lines and touch sense lines.

In some examples, a touch or hover event can be detected at a touch node on active display/touch area 102 when a finger, stylus, or other object causes a capacitive change on a sense line that is detectable by touch controller 110 from sense signals 128 (e.g., sensing a change in the capacitive coupling between a stimulated drive line and a sense line caused by a finger or other object). Touch controller 110 can detect changes in capacitance at each touch node and thereby recognize a touch location based on the position of the affected touch node or nodes. In some examples, touch controller 110 can detect location, pressure, direction, speed, acceleration, and the like of objects as they are moved across active/display touch area 102. Although certain examples are illustrated herein, a variety of touch sensing technologies can be used in conjunction with the examples of the disclosure, such as self-capacitance touch sensing, mutual capacitance touch sensing, resistive touch sensing, projection scan touch sensing, and the like. Furthermore, while various examples describe a sensed touch, it should be appreciated that a hovering object can also be sensed. Likewise, objects can also be sensed, including active objects operable to provide a signal to be sensed and recognized. Thus, touch controller 110 can control touch sensing operations on active display/touch area 102 in a variety of ways.

Independent from touch controller 110, touch controller 112 can control touch sensing operations in active display/touch area 104. Touch controller 112 can generate stimulation signals 124 and can receive sense signals 130. In one example, stimulation signals 124 can supply touch drive lines that extend across active display/touch area 104. Sense signals 130 can be derived from sense lines that extend across active display/touch area 104 in a direction perpendicular to the touch drive lines. Touch nodes can be formed at the intersections of touch drive lines and touch sense lines. In some examples, a touch or hover event can be detected at a touch node on active display/touch area 104 when a finger, stylus, or other object causes a capacitive change on a sense line that is detectable by touch controller 112 from sense signals 130. Thus, touch controller 112 can control touch sensing operations for active display/touch area 104 independently from touch controller 110 controlling touch sensing operations for active display/touch area 102.

Although FIG. 1 illustrates touch controllers 110 and 112 as separate elements, in other examples, a single touch controller can control touch sensing operations in both area 102 and area 104 by generating both stimulation signals 120 and stimulation signals 124 and receiving both sense signals 128 and sense signals 130. In addition, touch controllers 110 and 112 can be incorporated into LCD drivers 106 and 116 or gate drivers 108 and 114 as multi-purpose circuit elements. It should be understood that many circuit configurations are possible to achieve the functionality described of controlling display operations and touch sensing operations independently on multiple portions of a single touch sensitive display.

Circuit elements within active display/touch areas 102 and 104 can be shared or serve multiple purposes. For example, while the example of FIG. 1 referred to separate display data, touch drive, sense, and gate lines as in an "on-cell" touch sensitive display or "back-of-cover" touch sensitive display, in other examples, an integrated cell touch sensitive display approach can be used or "in-cell" approach. In such an in-cell approach, display data lines can also, for example, function as touch drive lines. Similarly, gate lines can also, for example, function as touch sense lines. In other examples, common voltage lines that extend across a display area can be used for both display operations and touch sensing operations at different times. It is further to be understood that a touch sensitive display according to various examples is not limited to the components and configuration illustrated in FIG. 1, but can include additional or other components in the same or different configurations capable of performing according to various examples. Although the example of FIG. 1 shows only two active display/touch areas, the touch sensitive display can include more areas depending on the requirements of the display.

Figure 2:
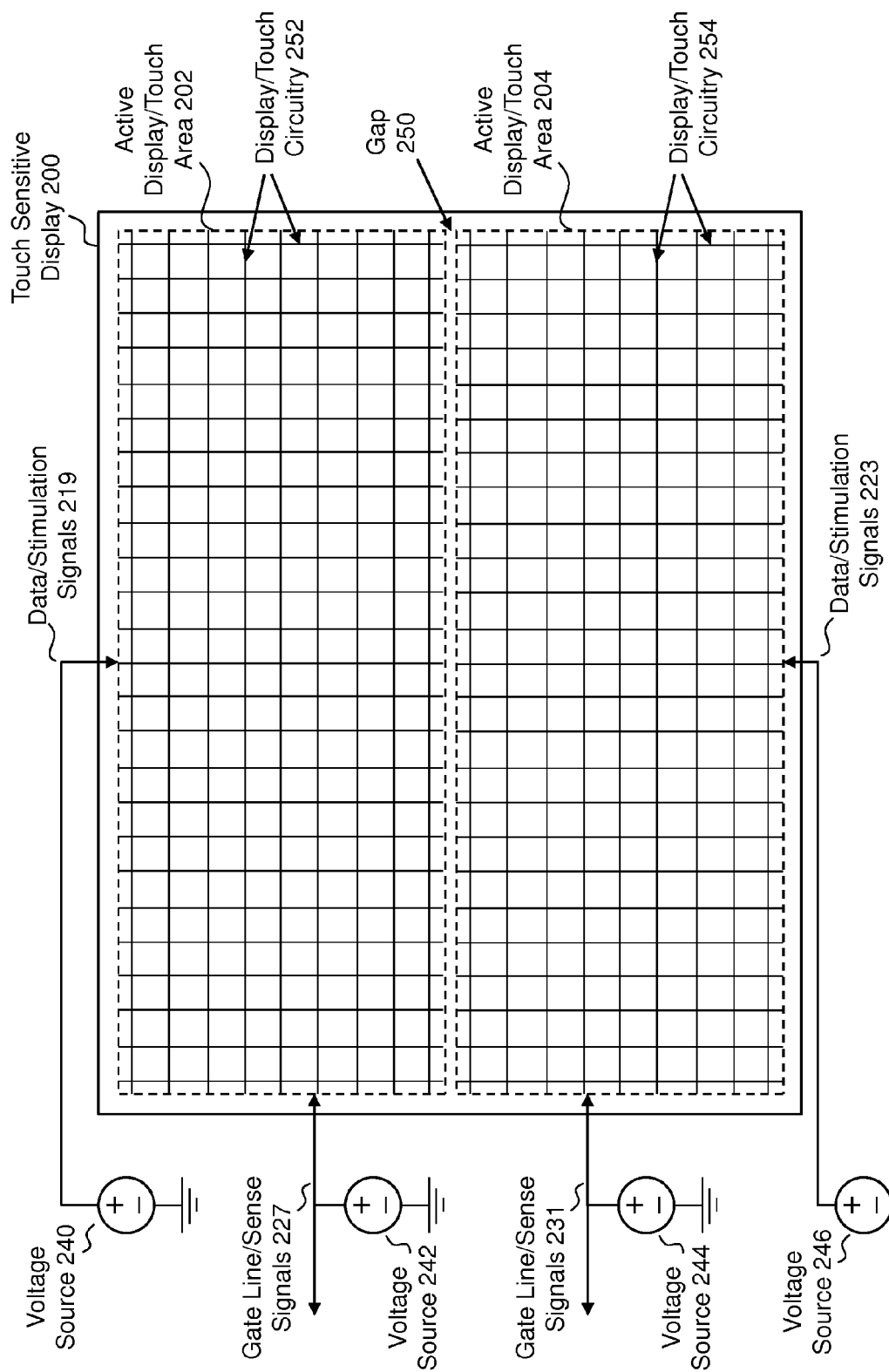
FIG. 2 illustrates an exemplary touch sensitive display with segmented display/touch areas separated by a gap according to various examples.

FIG. 2 illustrates exemplary touch sensitive display 200 according to various examples discussed herein with gap 250 separating display/touch circuitry 252 from display/touch circuitry 254. Gap 250 can enable performing display operations and touch sensing operations in active display/touch area 202 independently from display operations and touch sensing operations in active display/touch area 204. Although illustrated as a noticeable separation for explanation purposes, gap 250 can be narrow and invisible to the naked eye (e.g., detectable under microscope or the like). By keeping display/touch circuitry 252 separated from display/touch circuitry 254, display and touch sensing operations can be performed using circuitry 252 without significantly interfering with operations being performed using circuitry 254. For example, in a first mode, display refreshing operations can be performed using display/touch circuitry 252 in active display/touch area 202 while touch sensing operations are performed using display/touch circuitry 254 in active display/touch area 204. After a period of time, in a second mode, the operations can be switched in the respective regions to alternatingly perform display and touch sensing operations in both area 202 and area 204. A switching element (not shown) can be used to facilitate the operations being switched between areas 202 and 204. The switching element can be implemented in software, firmware, or hardware and can be any suitable element capable of facilitating the switching.

Display/touch circuitry 252 and display/touch circuitry 254 can be embedded within touch sensitive display 200 at various layers in an LCD display stack. Although display/touch circuitry 252 and 254 are illustrated with simple, visible intersecting lines, it should be understood that such circuitry can be invisible to the naked eye and can include any number of lines and components. For example, circuitry embedded within active display/touch area 202 and active display/touch area 204 can include data lines, gates lines, voltage lines, sense lines, drive lines, and the like that include indium-tin-oxide (ITO) or similarly transparent circuit materials. As such, circuitry 252 and 254 as well as gap 250 can be invisible to the naked eye (e.g., detectable under microscope or the like), and a user of touch sensitive display 200 can see images from display pixels unobstructed by the transparent circuit materials. Additionally, while the intersecting lines of circuitry 252 and circuitry 254 are shown in FIG. 2 in a crossing configuration, it should be appreciated that other configurations are also possible to form desired display control and touch sensing patterns.

LCD drivers and sense controllers used to perform display operations and touch sensing operations can include a variety of voltage sources to supply data lines, gate lines, voltage lines, sense lines, drive lines, and the like embedded within touch sensitive display 200. For example, voltage source 240 can supply data/stimulation signals 219 to data lines in display/touch circuitry 252 that extend vertically across active display/touch area 202, terminating at gap 250. Under control of an LCD driver and touch controller, voltage source 240 can supply display data signals and touch sensing stimulation signals at different times to data lines used to perform both display operations and touch sensing operations (e.g., as in an in-cell configuration). Similarly, in active display/touch area 204, voltage source 246 can supply data/stimulation signals 223 to data lines in display/touch circuitry 254 that extend vertically across active display/touch area 204, terminating at gap 250. Voltage source 246 can likewise supply display data signals and touch sensing stimulation signals at different times to data lines used to perform both display operations and touch sensing operations (e.g., as in an in-cell configuration).

In communication with an LCD driver, voltage source 242 can supply gate line signals 227 to gate lines in display/touch circuitry 252 that extend horizontally across active display/touch area 202. As mentioned above, gate line signals can indicate which row or column of display pixels is to be updated with data on perpendicularly situated data lines. In an in-cell configuration, during touch sensing operations, voltage source 242 can be disconnected from gate line/sense signals 227 (e.g., with a gate or the like (not shown)) or can be set to a constant level (e.g., zero volts). Instead of signals being driven onto gate lines in display/touch circuitry 252, during touch sensing operations, sense signals 227 can be detected from gate lines in display/touch circuitry 252 as a result of data/stimulation signals 219 on perpendicularly situated data lines and the presence (if any) of a finger or other object in active display/touch area 202. In this manner, gate lines in display/touch circuitry 252 can be utilized for both display operations and touch sensing operations in active display/touch area 202.

Similarly, in active display/touch area 204, voltage source 244 can supply gate line signals 231 to gate lines in display/touch circuitry 254 that extend horizontally across active display/touch area 204. During touch sensing operations, voltage source 246 can be disconnected from gate line/sense signals 227 (e.g., with a gate or the like (not shown)) or can be set to a constant level (e.g., zero volts). Instead of signals being driven onto gate lines in display/touch circuitry 252, during touch sensing operations, sense signals 231 can be detected from gate lines in display/touch circuitry 254 as a result of data/stimulation signals 223 on perpendicularly situated data lines and the presence (if any) of a finger or other object in active display/touch area 204.

Thus, a variety of voltage sources can be used to generate signals to independently control display operations and touch sensing operations in each of active display/touch areas 202 and 204. Similarly, in the in-cell example of FIG. 2, display/touch circuitry 252 and display/touch circuitry 254 can be used at different times to perform both display operations and touch sensing operations. For example, display gate lines can function as touch sense lines, and display data lines can function as touch stimulation drive lines. In other examples, however, display gate lines can function as touch stimulation drive lines, and display data lines can function as touch sense lines. It should be understood that a particular configuration can be selected based on a desired approach, hardware design constraints, or the like.

Although FIG. 2 illustrates an in-cell configuration in which circuitry embedded within touch sensitive display 200 can be used for both display operations and touch sensing operations, in other examples, display circuitry and touch sensing circuitry can be separated as in an on-cell configuration. It should be understood that voltage sources 240, 242, 244, and 246 can be duplicated, if desired, to supply separate display circuitry and touch sensing circuitry in other examples. Additional voltage sources, controllers, drivers, and the like can also be added for different configurations, as desired. It is, therefore, to be understood that a touch sensitive display according to various examples is not limited to the components and configuration illustrated in FIG.

2, but can include additional or other components in the same or different configurations.

Figure 3:
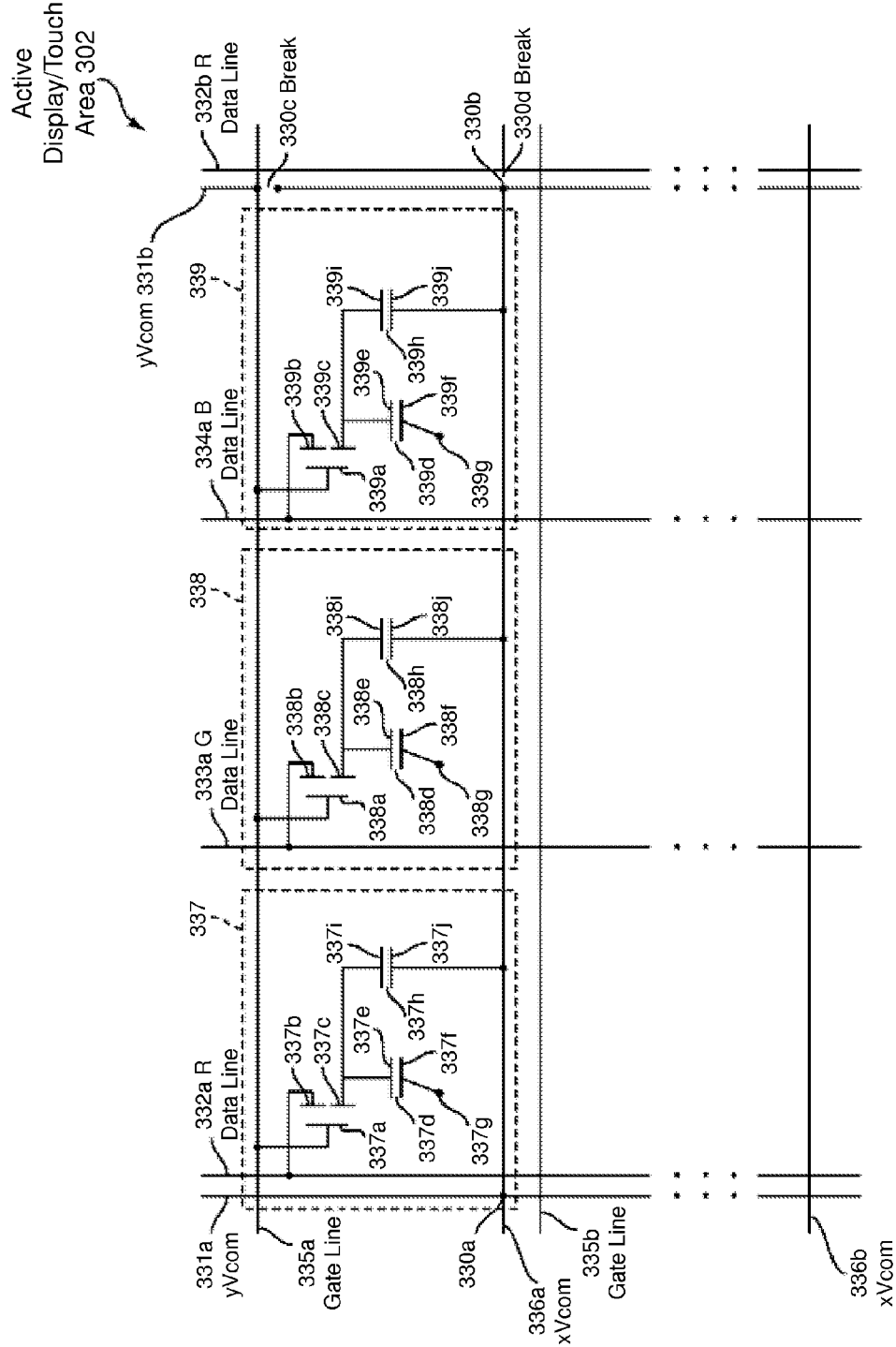
FIG. 3 illustrates exemplary integrated cell circuitry for performing display operations and touch sensing operations using common circuit elements according to various examples.

FIG. 3 illustrates exemplary integrated cell circuitry for performing display operations and touch sensing operations using common circuit elements according to various examples (e.g., an in-cell approach). Display/touch circuitry 252 and display/touch circuitry 254 of FIG. 2 can include the integrated cell circuitry illustrated in FIG. 3. Similarly, in some examples, circuitry in active display/touch area 102 and active display/touch area 104 of FIG. 1 can include the integrated cell circuitry illustrated in FIG. 3.

FIG. 3 illustrates a partial circuit diagram of an exemplary combination display pixel and touch node of active display/touch area 302 of an integrated touch sensitive display. In the example of FIG. 3, active display/touch area 302 can include LCD subpixels according to various examples. The subpixels of active area 302 can be configured such that they can be capable of dual-functionality as both display subpixels and touch node sensor elements. That is, the subpixels can include capacitive elements or electrodes that can operate as part of the display circuitry of the display pixels and that can also operate as elements of touch sensing circuitry. In this way, active area 302 can operate as a display with integrated touch sensing capability. FIG. 3 shows details of subpixels 337, 338, and 339 of active area 302. Note that each of the subpixels can represent red (R), green (G), or blue (B), with the combination of all three R, G, and B subpixels forming a single color pixel.

Subpixel 338 can include a thin film transistor (TFT) with gate 338a, source 338b, and drain 338c. Subpixel 338 can also include storage capacitor, Cst 338h, with upper electrode 338i and lower electrode 338j, liquid crystal capacitor, Clc 338d, with subpixel electrode 338e and common electrode 338f, and color filter voltage source, Vcf 338g. If a subpixel is an in-plane-switching (IPS) device, Vcf can be, for example, a fringe field electrode connected to a common voltage line in parallel with Cst 338h. If a subpixel does not utilize IPS, Vcf 338g can be, for example, an ITO layer on the color filter glass. Subpixel 338 can also include a portion of a data line for green (G) color data, G data line 333a, and a portion of gate line 335a. Gate 338a can be connected to gate line portion 335a, and source 338c can be connected to G data line portion 333a. Upper electrode 338i of Cst 338h can be connected to drain 338c, and lower electrode 338j of Cst 338h can be connected to a portion of a common voltage line that runs in the x-direction, xVcom 336a. Subpixel electrode 338e of Clc 338d can be connected to drain 338c, and common electrode 338f of Clc 338d can be connected to Vcf 338g.

The circuit diagram of subpixel 339 can be identical to that of subpixel 338. However, as shown in FIG. 3, color data line 334a running through subpixel 339 can carry blue (B) color data. Subpixels 338 and 339 can be, for example, known display subpixels.

Similar to subpixels 338 and 339, subpixel 337 can include a thin film transistor (TFT) with gate 337a, source 337b, and drain 337c. Subpixel 337 can also include storage capacitor, Cst 337h, with upper electrode 337i and lower electrode 337j, liquid crystal capacitor, Clc 337d, with subpixel electrode 337e and common electrode 337f, and color filter voltage source, Vcf 337g. Subpixel 337 can also include a portion of a data line for red (R) color data, R data line 332a, and a portion of gate line 335a. Gate 337a can be connected to gate line portion 335a, and source 337b can be connected to R data line portion 332a. Upper electrode 337i of Cst 337h can be connected to drain 337c, and lower electrode 337j of Cst 337h can be connected to a portion of xVcom 336a. Subpixel electrode 337e of Clc 337d can be connected to drain 337c, and common electrode 337f of Clc 337d can be connected to Vcf 337g.

Unlike subpixels 338 and 339, subpixel 337 can also include a portion of a common voltage line running in the y-direction, yVcom 331a. In addition, subpixel 337 can include a connection 330a that connects portion of yVcom 331a to portion of xVcom 336a. Thus, connection 330a can connect xVcom 336a and yVcom 331a. Connection 330b can provide a similar connection for other subpixels (not shown) in a similar fashion.

A subpixel along R data line 332b (only partially shown at the right in FIG. 3) can be similar to subpixel 337, except that a portion of yVcom 331b can have a break (open) 330c, and a portion of xVcom 336a can have a break 330d. Other subpixels below can be connected to xVcom 336b and gate line 335b in a similar fashion as subpixels 337, 338, and 339.

As can be seen in FIG. 3, the lower electrodes of storage capacitors of subpixels 337, 338, and 339 can be connected together by xVcom 336a. This can be, for example, a type of connection in known display panels and, when used in conjunction with known gate lines, data lines, and transistors, can allow subpixels to be addressed. The addition of vertical common voltage lines along with connections to the horizontal common voltage lines can allow grouping of subpixels in both the x-direction and y-direction, as described in further detail below. For example, yVcom 331a and connection 330a to xVcom 336a can allow the storage capacitors of subpixels 337, 338, and 339 to be connected to storage capacitors of subpixels that are above and below subpixels 337, 338, and 339 (the subpixels above and below are not shown). For example, the subpixels immediately above subpixels 337, 338, and 339 can have the same configurations as subpixels 337, 338, and 339, respectively. In this case, the storage capacitors of the subpixels immediately above subpixels 337, 338, and 339 would be connected to the storage capacitors of subpixels 337, 338, and 339.

In general, an active display/touch area of an integrated touch sensitive display can be configured such that the storage capacitors of all subpixels in the active area can be connected together, for example, through at least one vertical common voltage line with connections to horizontal common voltage lines. Another active area can be configured such that different groups of subpixels can be connected together to form separate regions of connected-together storage capacitors.

One way to create separate regions can be by forming breaks (opens) in the horizontal and/or vertical common lines. For example, yVcom 331b of active area 302 can have break 330c, which can allow subpixels above the break to be isolated from subpixels below the break. Likewise, xVcom 336a can have break 330d, which can allow subpixels to the right of the break to be isolated from subpixels to the left of the break.

Touch regions in an active area of an integrated touch sensitive display can be formed by groups of pixels (each pixel including a red, green, and blue subpixel as in FIG. 3) electrically connected together to form drive regions for driving stimulation signals and to form sense regions for sensing a touch or near touch of an object, such as a finger, on the display, during touch sensing operations.

A touch stimulation drive region can be formed by connecting at least one vertical common voltage line (e.g., yVcom 331a) of a pixel with at least one horizontal common voltage line (e.g., xVcom 336a) of the pixel at an xVcom-yVcom connection (e.g., connection 330a), thereby forming a drive region including a row of pixels. A drive plate (e.g., an ITO plate) can be used to cover the drive region and connect to the vertical and horizontal common voltage lines so as to group the pixels together to form the drive region for touch sensing operations. Generally, a drive region can be larger than a single row of pixels, comparable to the size of a fingertip, for example, in order to effectively receive a touch or near touch in active display/touch area 302 of the display. For example, a drive region can be formed by connecting vertical common voltage lines yVcom with horizontal common voltage lines xVcom, thereby forming a drive region including a matrix of pixels. In some examples, drive regions proximate to each other can share horizontal common voltage lines xVcom as drive lines, which can be used to stimulate the drive regions with stimulation signals. In some examples, drive regions proximate to each other can share vertical common voltage lines yVcom with breaks in the lines between the drive regions in order to minimize the lines causing parasitic capacitance that could interfere with the received touch or near touch. Optionally and alternatively, the vertical common voltage line breaks can be omitted and the lines shared in their entirety among the drive regions.

A sense region can be formed by at least one vertical common voltage line of a pixel, thereby forming a sense region including a column of pixels connected through a yVcom connection. A sense plate (e.g., an ITO plate) can be used to cover the sense region and connect to the vertical common voltage line so as to group the pixels together to form the sense region for touch sensing operations. Generally, a sense region can be larger than a single column of pixels in order to effectively sense a received touch or near touch on the touch sensitive device. For example, a sense region can be formed by vertical common voltage lines yVcom, thereby forming a sense region including a matrix of pixels. In some examples, a sense region can include vertical common voltage lines yVcom as sense lines, which can transmit a touch signal based on a touch or near touch. In the sense region, the vertical common voltage lines yVcom can be unconnected from and can cross over the horizontal common voltage lines xVcom at a bypass to form a mutual capacitance structure for touch sensing in some examples.

Each pixel can also include a gate line (e.g., gate line 335*a*) that can electrically connect to other pixels in the same row. The gate lines can activate the pixels to display an image or graphic during display operations. Each pixel can also include data lines (such as R, G, and B lines as in FIG. 3) which carry the images or graphics displayed during display operations.

During touch sensing operations, the horizontal common voltage lines xVcom can transmit stimulation signals to stimulate the drive regions to form electric field lines between the stimulated drive regions and adjacent sense regions. When an object, such as a finger, touches or near touches a stimulated drive region, the object can affect some of the electric field lines extending to the adjacent sense regions, thereby reducing the amount of charge coupled to these adjacent sense regions. This reduction in charge can be sensed by the sense regions as an "image" of touch. This touch image can be transmitted along the vertical common voltage lines yVcom of the sense regions to touch circuitry for further processing.

During display operations, the gate lines can transmit activation signals to activate the pixels to display image or graphic data being transmitted along the data lines.

For in-cell configurations, it is to be understood that the pixels used to form the touch regions are not limited to those described above, but can be any suitable pixels having display and touch capabilities according to various examples. Likewise, although voltage lines are used to describe touch sensing operations in the illustrated examples, other lines (e.g., gate lines, data lines, or the like) can be used in addition to or as an alternative to the voltage lines. Particular horizontal or vertical orientations can also be altered, as desired, without departing from the scope of this disclosure.

As discussed above, circuitry in various examples can be segmented into multiple portions in a single display that are independently operable. In FIG. 3, for example, data lines 332*a*, 333*a*, 334*a*, and 332*b* and common voltage lines 331*a* and 331*b* can extend half-way across a display/touch area before terminating at a gap, and a second set of separate data lines and separate common voltage lines can then extend across the other half of the display/touch area on the other side of the gap. In other examples, gate lines 335*a* and 335*b* and common voltage lines 336*a* and 336*b* can extend half-way across a display/touch area before terminating at a gap, and a second set of gate lines and common voltage lines can then extend across the other half of the display/touch area on the other side of the gap. In this manner, display circuitry and touch sensing circuitry can be operated independently in the different portions of the display/touch area (e.g., performing display operations or touch sensing operations in one portion without interfering with display operations or touch sensing operations in another portion).

FIG. 4A illustrates exemplary LCD display circuitry for performing display operations, and FIG. 4B illustrates exemplary touch sensing circuitry for performing touch sensing operations in an on-cell or back-of-cover configuration according to various examples. Display/touch circuitry 252 and display/touch circuitry 254 of FIG. 2 can include the on-cell or back-of-cover circuitry illustrated in FIG. 4A and FIG. 4B. Similarly, in some examples, circuitry in active display/touch area 102 and active display/touch area 104 of FIG. 1 can include the on-cell or back-of-cover circuitry illustrated in FIG. 4A and FIG. 4B. In general, in an on-cell or back-of-cover configuration, touch sensing circuitry can be positioned above and overlapping display circuitry in an LCD stack. For example, active touch area 403 can be positioned above and overlapping active display area 402 in an LCD stack.

In FIG. 4A, display circuitry can include pixel 442 in a row of pixels (not shown), with each pixel containing a set of color subpixels 444*a*, 444*b*, and 444*c* (red, green, and blue, respectively). Each color reproducible by the liquid crystal display can therefore be a combination of three levels of light emanating from a particular set of color subpixels.

For example, color subpixel 444*a* can include two electrodes that form a capacitor with the liquid crystal serving as a dielectric. This is shown as a liquid crystal capacitor 458*a* (denoted here as Clc) in FIG. 4A. Liquid crystal molecules situated between the two electrodes can rotate in the presence of a voltage to form a twisted molecular structure that can change the polarization angle of incident polarized light coming from the backlight to a first polarizer, for example. The net amount of change in polarization depends on the magnitude of the voltage, which can be adjusted to vary the degree of alignment of the polarization angle of the incident light with respect to a polarization angle of a second polarizer. Depending on the type of liquid crystal display, when a voltage is applied across the electrodes, a torque acts to align (twist or untwist) the liquid crystal molecules in a direction parallel or perpendicular to the electric field. In sum, by controlling the voltage applied across the electrodes, light can be allowed to pass through color subpixel 444a in varying amounts. Green subpixel 444b with Clc 458b and blue subpixel 444c with Clc 458c can operate in the same fashion.

In conventional thin film transistor active matrix-type displays, several gate lines 446 and R data lines 440a, G data lines 440b, and B data lines 440c can be formed in the horizontal and vertical directions, respectively. Each subpixel can include a thin film transistor (TFT), such as TFT 452a, 452b, and 452c, provided at the respective intersection of gate line 446 and one of data lines 440a, 440b, and 440c. A row of subpixels can be addressed by applying a gate signal on the row's gate line 446 (to turn on the TFTs of the row), and by applying voltages on the data lines 440a, 440b, and 440c corresponding to the amount of emitted light desired for each subpixel in the row.

The voltage level of each data line can be stored in storage capacitors Cst 456a, 456b, and 456c to maintain the desired voltage level across the two electrodes associated with liquid crystal capacitors Clc 458a, 458b, and 458c relative to color filter voltage sources 454a, 454b, and 454c (denoted here as VCF). Capacitor voltage line 448 (denoted here as $V_{CST}$) running horizontally across active display area 402 and parallel to gate line 446 can be used to charge storage capacitors 456a, 456b, and 456c. Capacitor voltage line 448 can be tied to other capacitor voltage lines as well as to color filter voltage source VCF. Note that if the associated color subpixel is an in-plane switching (IPS) device, the color filter voltage source can be provided, for example, by a fringe field electrode connected to a common voltage line. Alternatively, if the associated color subpixel does not utilize in-plane switching (non-IPS), the color filter voltage source can be provided, for example, through a layer of ITO patterned upon a color filter glass.

The display circuitry example of FIG. 4A can be used in conjunction with touch sensing circuitry illustrated in FIG. 4B. Such a configuration can be referred to as an on-cell or back-of-cover configuration as the touch sensing circuitry can be positioned above the display pixels in the LCD display stack, for example, on the back of a piece of cover glass.

In FIG. 4B, touch sensing circuitry can include an array of touch regions or nodes 464 that can be formed at the crossing points between rows of drive lines 460 (D0-D2) and columns of sense lines 462 (S0-S3). Each touch region 464 can have an associated mutual capacitance Csig 468 formed between the crossing drive lines 460 and sense lines 462 when the drive lines are stimulated. Drive lines 460 can be stimulated by stimulation signals 466 provided by drive circuitry (not shown) and can include an alternating current (AC) waveform. Sense lines 462 can transmit touch signals 474 indicative of a touch to touch sense control circuitry (not shown), which can include a sense amplifier for each sense line, or a fewer number of sense amplifiers that can be multiplexed to connect to a larger number of sense lines.

To sense a touch in active touch area 403, drive lines 460 can be stimulated by stimulation signals 466 to capacitively couple with crossing sense lines 462, thereby forming a capacitive path for coupling charge from drive lines 460 to sense lines 462. Crossing sense lines 462 can output touch signals 474, representing the coupled charge or current. When an object, such as a stylus, finger, etc., touches (or nearly touches) the touch circuitry, the object can cause capacitance Csig 468 to reduce by an amount ΔCsig at the touch location. This capacitance change ΔCsig can be caused by charge or current from stimulated drive line 460 being shunted through the touching object to ground rather than being coupled to crossing sense line 462 at the touch location. Touch signals 474 representative of capacitance change ΔCsig can be transmitted by sense lines 462 to touch sense control circuitry for processing. Touch signals 474 can indicate the touch region where the touch occurred and the amount of touch that occurred at that touch region location.

While the example shown in FIG. 4A includes three drive lines 460 and four sense lines 462, it should be appreciated that touch circuitry can include any number of drive lines 460 and any number of sense lines 462 to form the desired number and pattern of touch regions 464. Additionally, while drive lines 460 and sense lines 462 are shown in FIG. 4B in a crossing configuration, it should be appreciated that other configurations are also possible to form the desired touch region pattern. While FIG. 4B illustrates mutual capacitance touch sensing, other touch sensing technologies can also be used in conjunction with examples of the disclosure, such as self-capacitance touch sensing, resistive touch sensing, projection scan touch sensing, and the like. Furthermore, while various examples describe a sensed touch, it should be appreciated that touch sensing circuitry can also sense a hovering object and generate hover signals therefrom.

As discussed above, circuitry in various examples can be segmented into multiple portions in a single display that are independently operable. In FIG. 4A, for example, data lines 440a, 440b, and 440c can extend half-way across a display/touch area before terminating at a gap, and a second set of separate data lines can then extend across the other half of the display/touch area on the other side of the gap. In FIG. 4B, for example, drive lines 460 or sense lines 462 can extend half-way across a display/touch area before terminating at a gap, and a second set of separate drive lines or sense lines can then extend across the other half of the display/touch area on the other side of the gap. In this manner, display circuitry and touch sensing circuitry can be operated independently in the different portions of the display/touch area (e.g., performing display operations or touch sensing operations in one portion without interfering with display operations or touch sensing operations in another portion).

Figure 5:
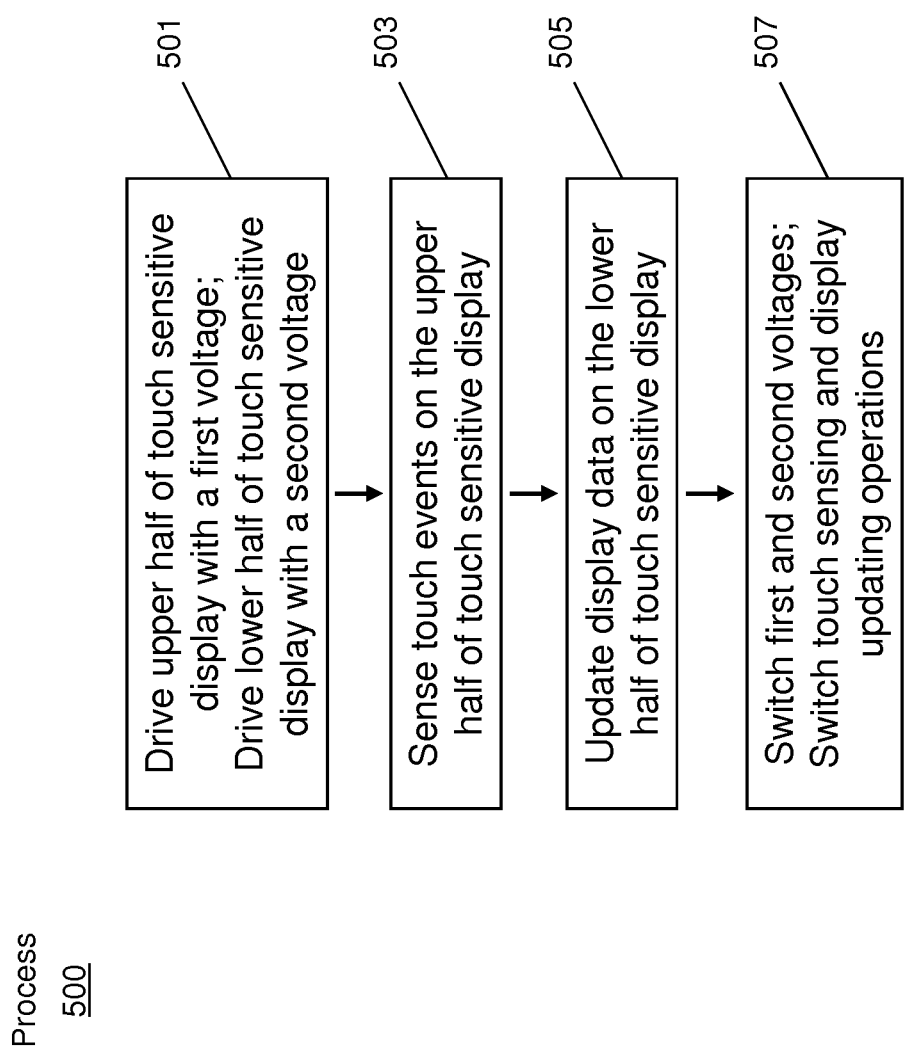
FIG. 5 illustrates an exemplary process for switching display operations and touch sensing operations on two independently operable halves of a touch sensitive display according to various examples.

FIG. 5 illustrates exemplary process 500 for switching display operations and touch sensing operations on two independently operable halves of a touch sensitive display according to various examples herein. At block 501, circuitry in an upper half of a touch sensitive display can be driven with a first voltage, and circuitry in a lower half of the touch sensitive display can be driven with a second voltage. The first voltage can include touch stimulation signals, including alternating current (AC) signals. The second voltage can include display data signals, including data for several display pixels.

At block 503, touch events can be sensed on the upper half of the touch sensitive display. This can be done using any of the touch sensing circuitry described herein, for example, using the first voltage from block 501 as touch stimulation signals in order to recognize touch events in the upper half of the touch sensitive display from resulting sense signals. Sense signals can be generated on sense lines from capacitive coupling between touch drive lines driven with touch stimulation signals and an object on or near the surface of the touch sensitive display according to various examples herein. Various other voltages and signals can also be used in conjunction with the first voltage touch stimulation signals in order to perform touch sensing operations in the upper half of the touch sensitive display.

At block 505, display data can be updated or refreshed on the lower half of the touch sensitive display. This can be done using any of the display circuitry described herein, for example, using the second voltage from block 501 as display data signals in order to load display data into display pixels in the lower half of the touch sensitive display. Gate line signals can be used to indicate which row or column of pixels is to be updated with display data at a particular time. Various other voltages and signals can also be used in conjunction with the display data signals to refresh or update the lower half of the touch sensitive display.

In some examples, touch sensing operations of block 503 in the upper half of the touch sensitive display can be performed simultaneously with display operations of block 505 in the lower half of the touch sensitive display. Circuitry for performing touch sensing and display operations can be segmented or split into two independently operable portions (e.g., the upper half and lower half of the touch sensitive display). As such, whether in-cell, on-cell, or another touch sensing circuitry configuration is used, touch sensing operations in one half of the display can avoid interfering with simultaneous display operations in the other half of the display.

At block 507, the first and second voltages can be switched (e.g., using a switching element), and touch sensing and display updating operations can likewise be switched. For example, first voltage touch stimulation signals can be driven on the lower half of the touch sensitive display, and second voltage display data signals can be driven on the upper half of the touch sensitive display. As such, display updating operations can be performed in the upper half of the display while touch sensing operations are performed in the lower half of the display. As mentioned above, as display and touch sensing circuitry can be segmented, display operations and touch sensing operations can occur simultaneously in different halves of the display without interference between the two operations (or with less interference than in alternative configurations).

In some examples, display operations and touch sensing operations can be performed at regular intervals. For example, the two operations can occur in succession within a given time period. For example, for the first 8 ms of a 16 ms time period, touch sensing operations can be performed in the upper half of a touch sensitive display while display operations are performed in the lower half of the touch sensitive display. For the last 8 ms of the time period, the operations can be switched: display operations can be performed in the upper half of the touch sensitive display while touch sensing operations are performed in the lower half of the touch sensitive display. It should be appreciated that display updating operations can include sequentially updating each row or column of display pixels in a portion of the display, and touch sensing operations can include sensing touch events in different regions of a portion of the display. It should likewise be appreciated that the operations can be performed in any amount of time, and regular intervals or refresh rates can be any number suitable for performing the operations. For example, the operations can be performed in less than 8 ms in some examples, and the time period and operation durations can be adjusted, as desired. After the exemplary 16 ms time period lapses, the operations can again be switched and repeated to alternatingly update the display and sense touch events in both (or all) independently operable portions of the touch sensitive display.

Although various examples have been described in which touch sensing operations and display operations are performed concurrently in different independently operable portions of a touch sensitive display, it should be appreciated that display operations can be performed concurrently in independently operable portions of the display, and touch sensing operations can be performed concurrently in independently operable portions of the display. For example, display operations can be performed simultaneously in two independently operable display portions; subsequently, touch sensing operations can be performed simultaneously in the two independently operable display portions. In other examples, display and touch sensing operations in different independently operable display portions can be partially offset, as desired.

Figure 6:
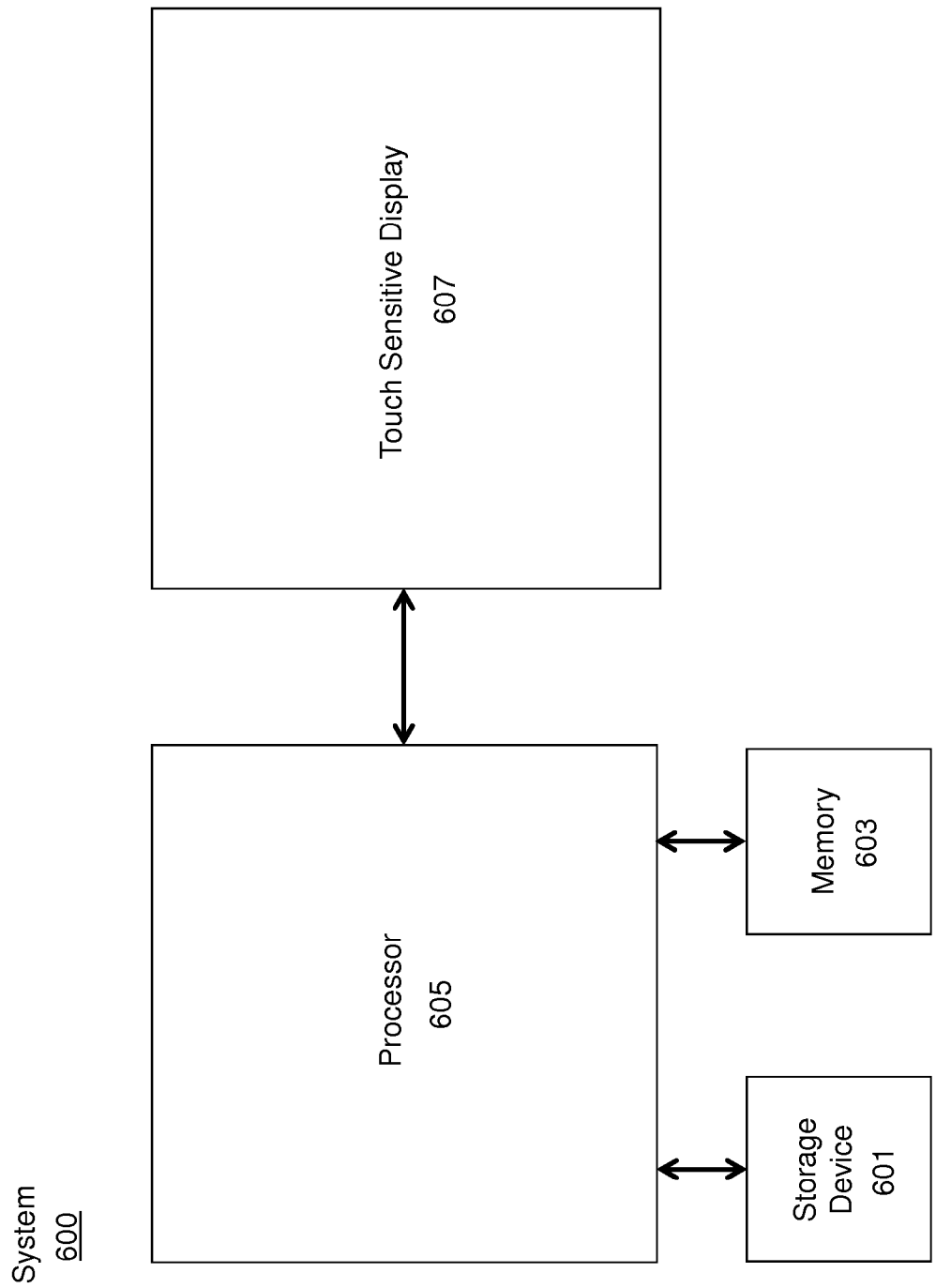
FIG. 6 illustrates an exemplary system for switching display operations and touch sensing operations on two independently operable halves of a touch sensitive display according to various examples.

One or more of the functions relating to segmented touch sensitive displays described above can be performed by a system similar or identical to system 600 shown in FIG. 6. System 600 can include instructions stored in a non-transitory computer readable storage medium, such as memory 603 or storage device 601, and executed by processor 605. The instructions can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such as CD, CD-R, CD-RW, DVD, DVD-R, or DVD-RW, or flash memory such as compact flash cards, secured digital cards, USB memory devices, memory sticks, and the like.

The instructions can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate, or transport the program for use by or in connection with the instruction execution system, apparatus, or device. The transport medium can include, but is not limited to, an electronic, magnetic, optical, electromagnetic, or infrared wired or wireless propagation medium.

System 600 can further include touch sensitive display 607 coupled to processor 605. Touch sensitive display 607 can include a segmented touch sensitive display similar or identical to those described above with respect to FIG. 1, FIG. 2, FIG. 3, FIG. 4A, and FIG. 4B, including sense circuitry, which can include a sense amplifier for each sense line, or a fewer number of sense amplifiers that can be multiplexed to connect to a larger number of sense lines. Processor 605 can be coupled to receive an output from the sense circuitry and process the output to detect touch or hover events.

It is to be understood that the system is not limited to the components and configuration of FIG. 6, but can include other or additional components in multiple configurations according to various examples. Additionally, the components of system 600 can be included within a single device, or can be distributed between multiple devices. In some examples, processor 605 can be located within touch sensitive display 607.

Figure 7:
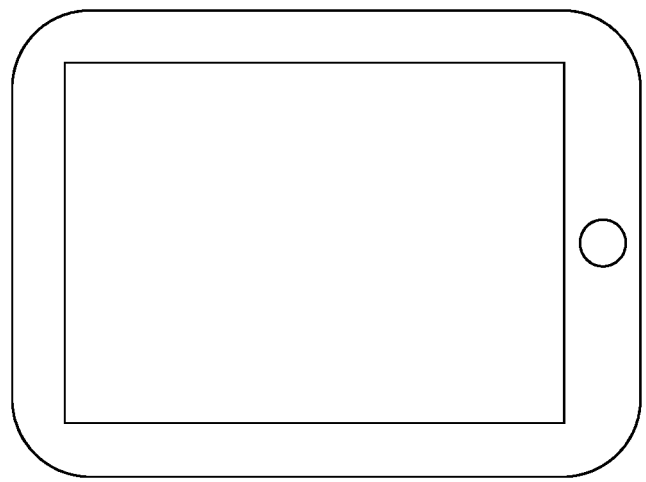
FIG. 7 illustrates an exemplary personal device that includes a touch sensitive display according to various examples.

FIG. 7 illustrates an exemplary personal device 700, such as a tablet, that can include a touch sensitive display according to various examples herein.

Figure 8:
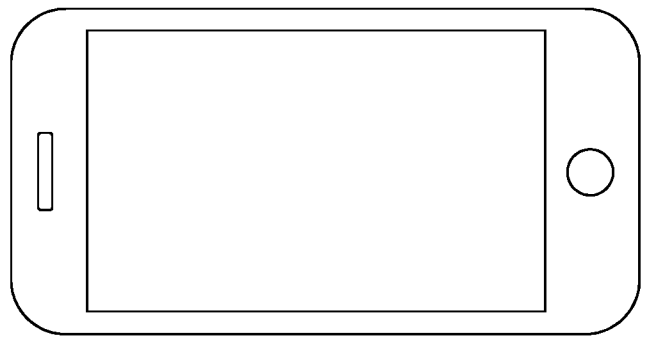
FIG. 8 illustrates another exemplary personal device that includes a touch sensitive display according to various examples.

FIG. 8 illustrates another exemplary personal device 800, such as a mobile phone, that can include a touch sensitive display according to various examples herein.

Therefore, according to the above, some examples of the disclosure are directed to an integrated touch sensitive display comprising: a first portion of the display comprising first integrated display and touch sensing circuitry; and a second portion of the display comprising second integrated display and touch sensing circuitry; wherein the second display and touch sensing circuitry is capable of operating independently from the first display and touch sensing circuitry. Additionally or alternatively to one or more of the examples disclosed above, in some examples an integrated touch sensitive display can further comprise: a first display driver capable of driving the first display portion, and a second display driver capable of driving the second display portion. Additionally or alternatively to one or more of the examples disclosed above, in some examples an integrated touch sensitive display can further comprise: a first touch controller capable of sensing touch events in the first display portion, and a second touch controller capable of sensing touch events in the second display portion. Additionally or alternatively to one or more of the examples disclosed above, in some examples the first display and touch sensing circuitry comprises a first plurality of data lines that extend in parallel from a first edge of the display to a center of the display, and the second display and touch sensing circuitry comprises a second plurality of data lines that extend in parallel from a second edge of the display to the center of the display. Additionally or alternatively to one or more of the examples disclosed above, in some examples a gap separates the first plurality of data lines from the second plurality of data lines. Additionally or alternatively to one or more of the examples disclosed above, in some examples an integrated touch sensitive display can be incorporated into at least one of a mobile phone or a tablet.

According to the above, other examples of the disclosure are directed to a touch sensitive display comprising: first display and touch sensing circuitry capable of carrying first signals and second signals associated with a first portion of the display; and second display and touch sensing circuitry capable of carrying third signals and fourth signals associated with a second portion of the display; wherein the first display and touch sensing circuitry is capable of performing operations independently from the second display and touch sensing circuitry. Additionally or alternatively to one or more of the examples disclosed above, in some examples the first signals comprise first display signals, the second signals comprise first display data, the third signals comprise second display signals, and the fourth signals comprise second display data; the first display and touch sensing circuitry is capable of transmitting the first display signals and the first display data to a first plurality of display pixels in the first portion of the display; and the second display and touch sensing circuitry is capable of transmitting the second display signals and the second display data to a second plurality of display pixels in the second portion of the display. Additionally or alternatively to one or more of the examples disclosed above, in some examples the operations comprise display operations, and the first display and touch sensing circuitry is capable of performing the display operations alternatingly with the second display and touch sensing circuitry. Additionally or alternatively to one or more of the examples disclosed above, in some examples the first signals comprise first stimulation signals, the second signals comprise first sense signals, the third signals comprise second stimulation signals, and the fourth signals comprise second sense signals; the first display and touch sensing circuitry is capable of transmitting the first stimulation signals to and receiving the first sense signals from a first plurality of touch nodes in the first portion of the display; and the second display and touch sensing circuitry is capable of transmitting the second stimulation signals to and receiving the second sense signals from a second plurality of display pixels in the second portion of the display. Additionally or alternatively to one or more of the examples disclosed above, in some examples the operations comprise touch sensing operations, and the first display and touch sensing circuitry is capable of performing the touch sensing operations alternatingly with the second display and touch sensing circuitry. Additionally or alternatively to one or more of the examples disclosed above, in some examples the operations comprise display operations and touch sensing operations; the display operations of the first display and touch sensing circuitry are capable of being performed concurrently with the touch sensing operations of the second display and touch sensing circuitry; and the touch sensing operations of the first display and touch sensing circuitry are capable of being performed concurrently with the display operations of the second display and touch sensing circuitry.

According to the above, other examples of the disclosure are directed to a touch sensitive display comprising: a first portion of the display; first circuitry capable of carrying first signals to the first display portion; a second portion of the display; and second circuitry capable of carrying second signals to the second display portion; wherein the first and second portions of the display are capable of switchably performing operations therebetween. Additionally or alternatively to one or more of the examples disclosed above, in some examples the first signals comprise first display signals and the second signals comprise second display signals; the first portion of the display comprises a first plurality of data lines that carry the first display signals from a first edge of the display to a middle of the display; and the second portion of the display comprises a second plurality of data lines that carry the second display signals from a second edge of the display to the middle of the display. Additionally or alternatively to one or more of the examples disclosed above, in some examples the first portion of the display comprises a first plurality of display pixels capable of displaying first display data in the first portion; the second portion of the display comprises a second plurality of display pixels capable of displaying second display data in the second portion; and the first portion of the display is capable of operating independently from the second portion of the display. Additionally or alternatively to one or more of the examples disclosed above, in some examples the first signals comprise first stimulation signals and the second signals comprise second stimulation signals; the first display portion comprises a first plurality of touch drive lines and touch sense lines; the second display portion comprises a second plurality of touch drive lines and touch sense lines; and the first plurality of touch drive lines and touch sense lines is separated by a gap from the second plurality of touch drive lines and touch sense lines. Additionally or alternatively to one or more of the examples disclosed above, in some examples the first portion of the display comprises a first plurality of touch nodes capable of detecting first touch events in the first portion; the second portion of the display comprises a second plurality of touch nodes capable of detecting second touch events in the second portion; and the first portion of the display is capable of operating independently from the second portion of the display. Additionally or alternatively to one or more of the examples disclosed above, in some examples the first circuitry comprises first display circuitry capable of performing first display operations and first touch circuitry capable of performing first touch sensing operations, the first display circuitry and the first touch circuitry being capable of using a first plurality of common signal lines in the first portion of the display at different times; and the second circuitry comprises second display circuitry capable of performing second display operations and second touch circuitry capable of performing second touch sensing operations, the second display circuitry and the second touch circuitry being capable of using a second plurality of common signal lines in the second portion of the display at different times.

According to the above, other examples of the disclosure are directed to a method comprising: driving a first portion of a touch sensitive display with a first voltage; driving a second portion of the display with a second voltage; sensing first touch events on the first portion of the display; updating first display data on the second portion of the display concurrently with sensing the first touch events on the first portion of the display; and switching the first voltage and the second voltage to sense second touch events on the second portion of the display and update second display data on the first portion of the display. Additionally or alternatively to one or more of the examples disclosed above, in some examples the first voltage comprises a plurality of touch stimulation signals; and the second voltage comprises a plurality of display data signals. Additionally or alternatively to one or more of the examples disclosed above, in some examples a method further comprises: alternating between a first mode and a second mode; wherein the first mode comprises concurrently sensing the first touch events on the first portion of the display and updating the first display data on the second portion of the display; and wherein the second mode comprises concurrently sensing the second touch events on the second portion of the display and updating the second display data on the first portion of the display. Additionally or alternatively to one or more of the examples disclosed above, in some examples the display comprises first integrated display and touch circuitry in the first portion of the display that is independently operable from second integrated display and touch circuitry in the second portion of the display.

According to the above, other examples of the disclosure are directed to a system comprising: a first active display/touch area in a touch sensitive display; first display circuitry operable to transmit first display data signals for refreshing first display data in the first active display/touch area; first touch circuitry operable to transmit first touch stimulation signals for sensing first touch events in the first active display/touch area; a second active display/touch area in the touch sensitive display; second display circuitry operable to transmit second display data signals for refreshing second display data in the second active display/touch area; second touch circuitry operable to transmit second touch stimulation signals for sensing second touch events in the second active display/touch area; wherein the first display refreshing and touch sensing in the first active display/touch area are independently operable from the second display refreshing and touch sensing in the second active/display touch area. Additionally or alternatively to one or more of the examples disclosed above, in some examples the first active display/touch area comprises the first display circuitry integrated with the first touch sensing circuitry; the second active/display touch area comprises the second display circuitry integrated with the second touch sensing circuitry; and the first integrated display and touch sensing circuitry of the first active display/touch area is capable of being operated independently from the second integrated display and touch sensing circuitry of the second active display/touch area. Additionally or alternatively to one or more of the examples disclosed above, in some examples the first active display/touch area and the second active display/touch area comprise a display stack with multiple layers; the first active display/touch area comprises: a first plurality of touch nodes in a first layer in the display stack and a first plurality of display pixels in a second layer in the display stack; and the second active display/touch area comprises: a second plurality of touch nodes in the first layer in the display stack and a second plurality of display pixels in the second layer in the display stack.

Although examples have been fully described with reference to the accompanying drawings, it is to be noted that various changes and modifications will become apparent to those skilled in the art. Such changes and modifications are to be understood as being included within the scope of the various examples as defined by the appended claims.

What is claimed is:

1. An integrated touch sensitive display comprising:
    a first portion of the display comprising first integrated display and touch sensing circuitry, the first integrated display and touch sensing circuitry including a first plurality of data lines that extend in parallel from a first edge of the display to a gap area dividing the display; and
    a second portion of the display comprising second integrated display and touch sensing circuitry, the second integrated display and touch sensing circuitry including a second plurality of data lines, different from the first plurality of data lines, that extend in parallel from a second edge of the display opposite that of the first edge to the gap area;
    wherein the second integrated display and touch sensing circuitry is configurable to perform touch sensing operations during a first time period, and the first integrated display and touch sensing circuitry is configurable to perform display operations simultaneous with the performance of the touch sensing operations by the second integrated display and touch sensing circuitry during the first time period, the second plurality of data lines configurable to carry second touch signals and the first plurality of data lines configurable to carry first display signals during the first time period; and
    wherein the second plurality of data lines are configurable to carry second display signals and the first plurality of data lines are configurable to carry first touch signals during a second time period different from the first time period.

2. The display of claim 1, further comprising:
    a first display driver configured for driving the first portion of the display; and a second display driver configured for driving the second portion of the display.

3. The display of claim 1, further comprising:
a first touch controller configured for sensing touch events in the first portion of the display; and
a second touch controller configured for sensing touch events in the second portion of the display.

4. The display of claim 1, wherein the gap area separates the first plurality of data lines from the second plurality of data lines.

5. The display of claim 1 incorporated into at least one of a mobile phone or a tablet.

6. A touch sensitive display comprising:
first display and touch sensing circuitry configured for carrying first signals and second signals associated with a first portion of the display, the second signals carried on a first plurality of data lines that extend in parallel from a first edge of the display to a gap area dividing the display; and
second display and touch sensing circuitry configured for carrying third signals and fourth signals associated with a second portion of the display, the fourth signals carried on a second plurality of data lines, different from the first plurality of data lines, that extend in parallel from a second edge of the display opposite that of the first edge to the gap area;
wherein the first display and touch sensing circuitry is configurable for performing first display operations independently from a performance of second touch sensing operations at the second display and touch sensing circuitry during a first time period, the first plurality of data lines configurable to carry first display signals and the second plurality of data lines configurable to carry second touch signals during the first time period; and
wherein the first plurality of data lines are configurable to carry first touch signals and the second plurality of data lines are configurable to carry second display signals during a second time period different from the first time period.

7. The display of claim 6, wherein the first display and touch sensing circuitry is further configured for performing the first display operations alternatingly with first touch sensing operations.

8. The display of claim 7,
wherein the second display and touch sensing circuitry is further configured for performing the second touch sensing operations alternatingly with second display operations.

9. The display of claim 8, wherein the first display operations of the first display and touch sensing circuitry are capable of being performed concurrently with the second touch sensing operations of the second display and touch sensing circuitry; and
wherein the first touch sensing operations of the first display and touch sensing circuitry are capable of being performed concurrently with the second display operations of the second display and touch sensing circuitry.

10. The display of claim 6;
wherein the first display and touch sensing circuitry is configured for transmitting first stimulation signals to and receiving first sense signals from a first plurality of touch nodes in the first portion of the display; and
wherein the second display and touch sensing circuitry is configured for transmitting second stimulation signals to and receiving second sense signals from a second plurality of touch nodes in the second portion of the display.

11. A touch sensitive display comprising:
a first portion of the display, the first portion of the display including a first plurality of data lines that extend in parallel from a first edge of the display to a gap area dividing the display;
first circuitry configured for carrying first signals for performing first display or touch sensing operations to the first plurality of data lines in the first portion of the display;
a second portion of the display, the second portion of the display including a second plurality of data lines that extend in parallel from a second edge of the display opposite that of the first edge to the gap area; and
second circuitry configured for carrying second signals for performing second touch sensing or display operations to the second plurality of data lines in the second portion of the display;
wherein the first and second portions of the display are configured for switchably performing the display and touch sensing operations therebetween.

12. The display of claim 11, wherein the first portion of the display comprises a first plurality of display pixels capable of displaying first display data in the first portion;
wherein the second portion of the display comprises a second plurality of display pixels capable of displaying second display data in the second portion; and
wherein the first portion of the display is capable of operating independently from the second portion of the display.

13. The display of claim 11, wherein the first circuitry is further configurable for generating first stimulation signals and the second circuitry is further configurable for generating second stimulation signals;
wherein the first portion of the display comprises a first plurality of touch drive lines and touch sense lines;
wherein the second portion of the display comprises a second plurality of touch drive lines and touch sense lines; and
wherein the first plurality of touch drive lines and touch sense lines is separated by the gap area from the second plurality of touch drive lines and touch sense lines.

14. The display of claim 11, wherein the first portion of the display comprises a first plurality of touch nodes capable of detecting first touch events in the first portion;
wherein the second portion of the display comprises a second plurality of touch nodes capable of detecting second touch events in the second portion; and
wherein the first portion of the display is capable of operating independently from the second portion of the display.

15. The display of claim 11, wherein the first circuitry is configurable for performing the first display operations and the first touch sensing operations using a first plurality of common signal lines in the first portion of the display at different times; and
wherein the second circuitry is configurable for performing the second display operations and the second touch sensing operations using a second plurality of common signal lines in the second portion of the display at different times.

16. A method comprising:
driving a first portion of a touch sensitive display with a first voltage and carrying the first voltage from a first edge of the display to a gap area dividing the display;

driving a second portion of the touch sensitive display with a second voltage and carrying the second voltage from a second edge of the display opposite that of the first edge to the gap area;

sensing first touch events on the first portion of the display;

updating second display data on the second portion of the display concurrently with sensing the first touch events on the first portion of the display; and switching the first voltage and the second voltage to sense second touch events on the second portion of the display and update first display data on the first portion of the display.

17. The method of claim 16, further comprising:
alternating between a first mode and a second mode;
wherein the first mode comprises concurrently sensing the first touch events on the first portion of the display and updating the second display data on the second portion of the display; and
wherein the second mode comprises concurrently sensing the second touch events on the second portion of the display and updating the first display data on the first portion of the display.

18. The method of claim 16, wherein the display comprises first integrated display and touch circuitry in the first portion of the display that is independently operable from second integrated display and touch circuitry in the second portion of the display.

19. A system comprising:
a first active display/touch area in a touch sensitive display including
first display circuitry operable to transmit first display data signals for refreshing first display data to a first plurality of data lines in the first active display/touch area, the first plurality of data lines extending in parallel from a first edge of the display to a gap area dividing the display, and
first touch sensing circuitry operable to transmit first touch stimulation signals for sensing first touch events to the first plurality of data lines in first active display/touch area; and
a second active display/touch area in the touch sensitive display including
second display circuitry operable to transmit second display data signals for refreshing second display data to a second plurality of data lines in the second active display/touch area, the second plurality of data lines extending in parallel from a second edge of the display opposite that of the first edge to the gap area, and
second touch sensing circuitry operable to transmit second touch stimulation signals for sensing second touch events to the second plurality of data lines in the second active display/touch area;
wherein the first display refreshing and touch sensing in the first active display/touch area are independently operable from the second display refreshing and touch sensing in the second active display/touch area, the first active display/touch area and the second active display/touch area perform display refreshing and touch sensing switchably therebetween.

20. The system of claim 19,
wherein the first active display/touch area is capable of being operated independently from the second active display/touch area.

21. The system of claim 19, wherein the first active display/touch area and the second active display/touch area comprise a display stack with multiple layers;
wherein the first active display/touch area comprises:
a first plurality of touch nodes in a first layer in the display stack; and
a first plurality of display pixels in a second layer in the display stack; and
wherein the second active display/touch area comprises:
a second plurality of touch nodes in the first layer in the display stack; and
a second plurality of display pixels in the second layer in the display stack.

\* \* \* \* \*